United States Patent [19]

Wiggins et al.

[11] Patent Number: 5,086,740

[45] Date of Patent: Feb. 11, 1992

[54] ENGINE ELECTRONIC THROTTLE CONTROL WITH CRUISE CONTROL FEATURE

[75] Inventors: Kregg S. Wiggins, Clarkston, Mich.; Danny O. Wright, Newport News, Va.

[73] Assignee: Siemens Automotive L.P., Auburn Hills, Mich.

[21] Appl. No.: 608,500

[22] Filed: Nov. 2, 1990

[51] Int. Cl.⁵ .................. B60K 31/04; F02D 11/10
[52] U.S. Cl. ............................ 123/361; 123/399; 180/179; 364/431.07; 364/431.11
[58] Field of Search ............... 123/361, 399; 364/431.07, 431.11; 180/178, 179

[56] References Cited

U.S. PATENT DOCUMENTS

| | | | |
|---|---|---|---|
| 4,169,437 | 10/1979 | Fleischer | 123/361 |
| 4,854,283 | 8/1989 | Kiyono et al. | 123/361 |
| 4,865,151 | 9/1989 | Kobayashi et al. | 123/361 |
| 5,002,028 | 3/1991 | Arai et al. | 123/399 |

FOREIGN PATENT DOCUMENTS 0057129  8/1982  European Pat. Off. ............ 180/178

*Primary Examiner*—Andrew M. Dolinar
*Attorney, Agent, or Firm*—George L. Boller; Russel C. Wells

[57] ABSTRACT

A cruise control sub-system is incorporated into an electronic throttle control system. The sub-system comprises a cruise control module that provides respective charge and discharge signals to a circuit for charging and discharging a capacitor. The voltage across the capacitor represents a cruise control signal and is supplied to a port of the electronic throttle control microprocessor. In the cruise control mode of operation, the microprocessor causes the throttle to be positioned by the cruise control signal. If the driver depresses the accelerator pedal to an extent that would command a throttle opening larger than that commanded by the cruise control signal, the microprocessor causes to throttle to be operated to the larger opening. When the cruise control mode of operation ceases, the throttle is controlled by the accelerator pedal alone. The microprocessor also performs testing of the cruise control sub-system and gives a fault indication if a fault is detected.

9 Claims, 1 Drawing Sheet

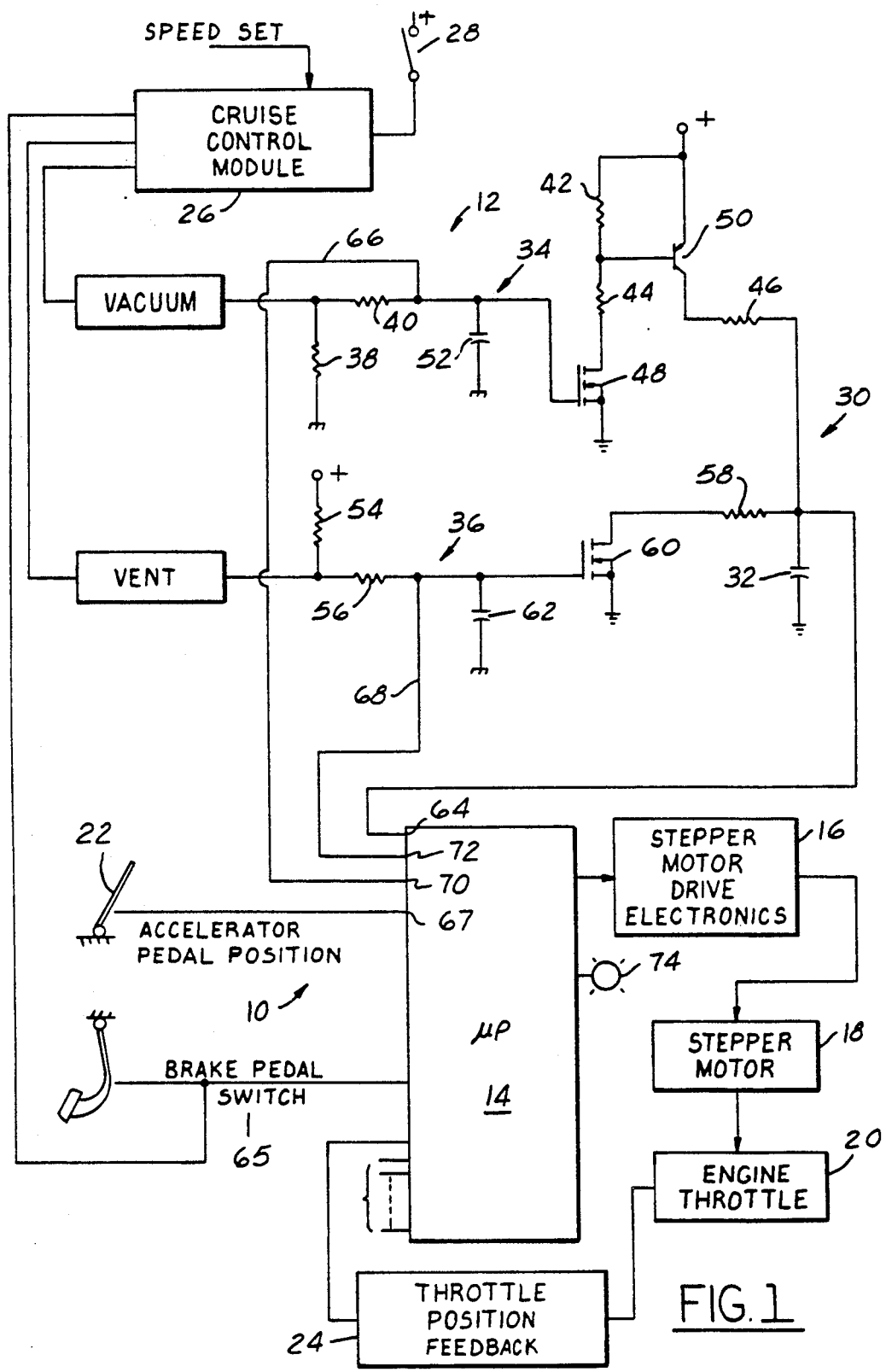

ENGINE ELECTRONIC THROTTLE CONTROL WITH CRUISE CONTROL FEATURE

FIELD OF THE INVENTION

This invention relates to an electronic throttle control system for an internal combustion engine.

BACKGROUND AND SUMMARY OF THE INVENTION

An electronic throttle control system for an internal combustion engine comprises an electric motor that operates the throttle in accordance with an electric signal from an accelerator pedal position sensor. A preferred configuration is a closed-loop control wherein control electronics compares the signal from the accelerator pedal position sensor with a signal from a throttle position sensor and causes the electric motor to operate in such a manner that correspondence of the throttle position to the accelerator pedal position is secured.

Cruise control, sometimes called speed control, is a popular feature of today's automotive vehicles. It is toward the integration of cruise control with electronic throttle control that the present invention is directed.

BRIEF DESCRIPTION OF THE DRAWINGS

FIG. 1 is a schematic diagram of an electronic throttle control system embodying a cruise control feature, and depicts a presently preferred embodiment according to the best mode contemplated at the present time for carrying out the invention.

DESCRIPTION OF THE PREFERRED EMBODIMENT

FIG. 1 shows an internal combustion engine electronic throttle control (ETC) system 10 which includes an electronic cruise control sub-system 12 embodying the inventive principles. ETC 10 comprises a known microprocessor 14 having an number of ports. It is via one or more of these ports that the microprocessor operates stepper motor drive electronics 16, which in turn operates a stepper motor 18 to position the engine throttle 20. The engine includes an electronic engine management system (not shown) that operates various engine sub-systems such as fuel control, spark timing, etc., and it is to be understood that the operation of the engine management system is properly coordinated with that of ETC system 10 so that as the driver operates the vehicle's accelerator pedal 22, proper response of the engine ensues. Throttle position feedback 24 provides the microprocessor with a signal indicating the actual throttle position. With the exception of electronic cruise control sub-system 12, the content of FIG. 1 represents an ETC system whose details are disclosed in issued patents commonly assigned, including U.S. Pat. Nos. 4,855,660; 4,869,220; 4,929,879; and 4,944,269.

Sub-system 12 comprises a cruise control module 26 that is turned on and off by a cruise select switch 28. When the cruise control is on, module 26 selectively delivers respective vacuum and vent signals. In known cruise control systems these signals are delivered to a vacuum motor (servo) that positions the engine throttle in a manner calculated to maintain the vehicle speed at a desired speed that has been set by the driver. In the sub-system of this invention, the vacuum and vent signals are delivered to a circuit 30 which is operatively connected with certain ports of microprocessor 14.

Circuit 30 comprises a main capacitor 32 that can be charged by a charge circuit portion 34 and discharged by a discharge circuit portion 36. The vacuum signal is supplied to an input of charge circuit portion 34, and the vent signal, to an input of discharge circuit portion 36.

Charge circuit portion 34 comprises resistors 38, 40, 42, 44, and 46, transistors 48 and 50, and a capacitor 52 connected as illustrated.

Discharge circuit portion 36 comprises resistors 54, 56, and 58, a transistor 60, and a capacitor 62 connected as illustrated.

The voltage charge across capacitor 32 is applied to a port 64 of microprocessor 14.

Sub-system 12 functions in the following manner. When the vacuum signal is given by cruise control module 26, both transistors 48 and 50 are rendered conductive to cause current to flow from a power supply through a path composed of the latter transistor and resistor 46 to charge capacitor 32. When the vacuum signal is not given, transistors 48 and 50 are rendered non-conductive, and consequently no charge current flows through transistor 50 to capacitor 32. When the vent signal is given, transistor 60 is rendered conductive to cause capacitor 32 to discharge through resistor 58 and transistor 60. When the vent signal is not given, transistor 60 is rendered non-conductive and hence is unable to discharge capacitor 32. The voltage across capacitor 32 represents a position to which throttle 20 is being commanded by cruise control module 26.

Microprocessor 14 is programmed to act upon the signals from the accelerator position 22 and capacitor 32 to cause throttle 20 to be positioned to the greater of the two respective throttle openings being commanded by 22 and 32. When the cruise control is off, capacitor 32 is discharged. This represents a mode of operation in which the throttle is controlled solely by the accelerator pedal. When the cruise control is on, the vacuum and vent signals are given in a manner that commands the throttle to a position for maintaining the set vehicle speed. Specifically, the microprocessor acts on the voltage that is produced across capacitor 32 by the on-off toggling of the vacuum and vent signals. The microprocessor acts to cause the throttle to therefore be positioned in accordance with the cruise control signal representing desired vehicle speed set by the driver unless the driver is operating the accelerator pedal to command an even greater speed in which case the microprocessor commands the throttle position to correspond to that of the accelerator pedal. Typical cruise control systems include a brake interrupt so that if the brake pedal is depressed while the cruise control is on, the cruise control is immediately deactivated and must be reset by the driver before it can again exert control over the throttle position. The system of FIG. 1 includes such a feature and illustrates a brake pedal switch 65 connected to cruise control module 26. Switch 65 is also shown connected to a port 67 of microprocessor 14 for use by ETC system 10.

A further aspect of the inventive principles is represented by the respective connections 66 and 68 of circuit portions 34 and 36 with ports 70 and 72 of microprocessor 14. Ports 70 and 72 are bi-directional, meaning that they can both transmit and receive. By monitoring the signals at the three ports 64, 70, and 72, the microprocessor can determine if the cruise control is off.

When the microprocessor detects that the cruise control is off, it can test the integrity of circuit 30 by applying test signals at ports 70 and 72 and monitoring the response that appears at port 64. The microprocessor is programmed in accordance with any desired algorithm deemed suitable for conducting the test. The testing can be conducted in accordance with any desired test schedule programmed into the microprocessor. If any test indicates a fault in circuit 30, the microprocessor can provide an appropriate indication to alert the driver, such as by illuminating a warning lamp 74, and can restrict control of the throttle to the accelerator pedal until such time as the fault in circuit 30 has been corrected.

Microprocessor 14 is also capable of checking cruise control module 26 in the following way. When the brake pedal is depressed thereby actuating switch 65, the cruise control module should immediately inhibit the vacuum signal and give the vent signal so as to cause capacitor 32 to immediately discharge. Since microprocessor 14 will be aware that switch 65 has been actuated because of the direct connection of switch 65 to microprocessor 14, the microprocessor can monitor proper response of module 26 via connections 66 and 68. Concurrently the proper response of circuit 30 can be monitored via port 64. Any improper response will illuminate warning lamp 74. It should be understood that the warning lamp is used to alert the driver, and that the microprocessor may contain specific fault codes which can be interrogated by suitable test equipment to ascertain the particular cause for an indicated fault.

The foregoing description has presented a preferred embodiment of the invention in a full, clear, and concise manner supporting the broad principles of the invention. Many of the specific details are not discussed since they are conventional and/or within the ordinary level of skill in the art.

What is claimed is:

1. An automotive vehicle internal combustion engine electronic throttle control system that controls the positioning of an engine throttle and comprises a microprocessor that receives both accelerator pedal position and throttle position signals and that operates to command an electric motor to secure correspondence of throttle position to accelerator pedal position, characterized in that a cruise control sub-system is cooperatively associated with the microprocessor, and in a cruise control mode of operation the cruise control sub-system provides a cruise control signal representing a desired cruise speed for the vehicle and the microprocessor operates to command said electric motor to secure correspondence of throttle position to the cruise control signal, wherein said cruise control sub-system comprises a cruise control module that issues respective charge and discharge signals that cause respective charge and discharge of a capacitor, and the voltage across said capacitor constitutes said cruise control signal and is delivered to one particular port of the microprocessor.

2. A system as set forth in claim 1 characterized further in that in the cruise control mode of operation the microprocessor operates to command said electric motor to secure correspondence of throttle position to accelerator pedal position whenever accelerator pedal position calls for a greater throttle opening than that called for by said cruise control signal.

3. A system as set forth in claim 1 in which respective connections between said cruise control sub-system and said microprocessor supply said respective charge and discharge signals to respective additional ports of said microprocessor, and said microprocessor comprises means to detect the existence and non-existence of the cruise control mode of operation and means effective when the cruise control mode of operation is non-existent to perform a test on a portion of said cruise control sub-system by applying test signals at said respective additional ports of said microprocessor and monitoring the response at said one port.

4. A system as set forth in claim 1 in which respective connections between said cruise control sub-system and said microprocessor supply said respective charge and discharge signals to respective additional ports of said microprocessor, and said microprocessor comprises means to detect the existence and non-existence of the cruise control mode of operation and means effective when the cruise control mode of operation is non-existent to perform a test on a portion of said cruise control sub-system by applying test signals at said respective additional ports of said microprocessor and monitoring the response at said one port.

5. A system as set forth in claim 1 characterized further in that said microprocessor comprises means for performing a test on said cruise control sub-system and for detecting potential fault in said cruise control sub-system.

6. A system as set forth in claim 5 characterized further in that said microprocessor comprises means to detect the existence and non-existence of the cruise control mode of operation and said means for performing a test on said cruise control sub-system and for detecting potential fault in said cruise control sub-system includes means effective during non-existence of the cruise control mode of operation for performing a test on said cruise control sub-system and for detecting potential fault in said cruise control sub-system.

7. A system as set forth in claim 6 characterized further in that said cruise control sub-system comprises a cruise control module that in cruise control mode of operation issues respective charge and discharge signals to respective inputs of a circuit to cause respective charge and discharge of a capacitor in said circuit, the voltage across said capacitor constitutes said cruise control signal and is delivered to one particular port of the microprocessor, respective bi-directional ports of said microprocessor are connected to said respective inputs, and said means effective during non-existence of the cruise control mode of operation for performing a test on said cruise control sub-system and for detecting potential fault in said cruise control sub-system comprises means for causing said microprocessor to apply test signals to said bi-directional ports and to monitor the response of said circuit to said test signals by monitoring the voltage at said one port and means to indicate a fault if the voltage at said one port fails to indicate a proper response by said circuit to said test signals.

8. A system as set forth in claim 5 characterized further in that said cruise control sub-system comprises a cruise control module that issues respective signals in the cruise control mode of operation, said system includes a brake pedal switch to indicate operation of a brake pedal for a vehicle containing the system, said brake pedal switch is an input to both said microprocessor and said cruise control module, and said means for performing a test on said cruise control sub-system and for detecting potential fault in said cruise control sub-system comprises means responsive to the actuation of said brake pedal switch to cause said microprocessor to look for particular conditions of said respective signals and to indicate a fault if those particular conditions are not found.

9. An automotive vehicle internal combustion engine electronic throttle control system that controls the positioning of an engine throttle and comprises a microprocessor that receives both accelerator pedal position and throttle position signals and that operates to command an electric motor to secure correspondence of throttle position to accelerator pedal position, characterized in that a cruise control sub-system is cooperatively associated with the microprocessor, and in a cruise control mode of operation the cruise control sub-system provides a cruise control signal representing a desired cruise speed for the vehicle and the microprocessor operates to command said electric motor to secure correspondence of throttle position to the cruise control signal, and characterized further in that said microprocessor comprises means for performing a test on said cruise control sub-system by applying test signals to the cruise control sub-system, for detecting potential fault in said cruise control sub-system by monitoring the response of the cruise control sub-system to said test signals, and for causing an indication of the detection of potential fault to be given.

* * * * *